United States Patent [19]

Stoakes

[11] 4,016,695

[45] Apr. 12, 1977

[54] STRUCTURAL ASSEMBLIES

[76] Inventor: Richard Lewis Stoakes, "Clouds", Northdown Road, Woldingham, Surry, England

[22] Filed: May 5, 1976

[21] Appl. No.: 683,251

Related U.S. Application Data

[63] Continuation of Ser. No. 529,054, Dec. 3, 1974, abandoned.

[30] Foreign Application Priority Data

Dec. 5, 1973 United Kingdom ............. 56288/73

[52] U.S. Cl. .................................. 52/476; 52/403; 52/395

[51] Int. Cl.[2] ........................ E04B 5/52; F16B 1/00

[58] Field of Search ............ 52/476, 235, 393, 395, 52/397, 400, 403, 758 H, 127

[56] References Cited

UNITED STATES PATENTS

| | | | |
|---|---|---|---|
| 2,837,153 | 6/1958 | Brown et al. | 52/758 H X |
| 3,118,188 | 1/1964 | Dulebohn et al. | 52/403 |
| 3,121,482 | 2/1964 | Cobb et al. | 52/395 |
| 3,205,630 | 9/1965 | Felix et al. | 52/395 |
| 3,367,077 | 2/1968 | Johnston | 52/395 |
| 3,638,385 | 2/1972 | Nobels et al. | 52/758 H X |
| 3,722,161 | 3/1973 | Brown | 52/397 X |
| 3,774,360 | 11/1973 | Hubbard et al. | 52/127 |
| 3,805,470 | 4/1974 | Brown | 52/397 X |

*Primary Examiner*—Price C. Faw, Jr.
*Assistant Examiner*—Robert C. Farber
*Attorney, Agent, or Firm*—Nichol M. Sandoe

[57] ABSTRACT

A structural assembly comprises a cellular frame structure in the cells of which panes or panels are mounted to form a curtain wall. The frame structure carries external sealing gaskets for the peripheries of said panes and arranged so that said panes are put in place from the interior face of the structure. Internally of said panes, clamping means are disposed to urge said panes into sealing engagement with the gaskets with an adjustable force. The external sealing gaskets cover those parts of the frame structure that project externally of said panes.

6 Claims, 5 Drawing Figures

STRUCTURAL ASSEMBLIES

This is a continuation of co-pending application Ser. No. 529,054, filed Dec. 3, 1974.

BACKGROUND OF THE INVENTION

This invention relates to structural assemblies for buildings or other architectural constructions and is particularly concerned with frame structures enclosing an area which is to be filled using one or more panes (i.e. transparent or translucent sheets) and/or panels mounted in the structure.

When creating such structural assemblies, for example as curtain walling, for a large building, especially a tall building, the task can be extremely difficult, particularly in adverse weather conditions. There is, for example, the problem of handling large panes of glass including lifting them some considerable height, and then locating and fixing them accurately often in high winds and with the construction workers themselves exposed to the weather conditions.

SUMMARY OF THE INVENTION

According to the present invention, in a frame structure for an external face of a building or other architectural construction, frame elements defining at least one planar space or cell to be filled by a pane or panel carry external sealing means adjacent a forward face of the structure from which the depth of the elements extends rearwardly and supplementary elements are located rearwardly of the external sealing means to engage the frame elements for holding the or each pane or panel against the sealing means, whereby said pane or panel can be mounted in place from the rear of the structure and is clamped in sealing engagement with the external sealing means by the supplementary elements.

With the such an arrangement, a pane or panel can be brought to an upper storey through the interior of the building so lessening the possibility of damage to it and of injury to the construction workers who are also able to fix it in place working from the exterior. It can nevertheless be possible to make this arrangement compatible with those in which panes or panels are fitted from the exterior so that a mixture of both methods can be used for different spaces or cells where this has advantages.

In a preferred feature of the invention the sealing means take the form of a covering between the frame elements and the exterior. This gives a weather seal that protects the frame elements as well as sealing the edges of the pane or panel. Thus, the covering of each frame element can comprise a pair of sealing gaskets that engage and overlie laterally opposite portions of a forward region of the frame element, and these gaskets engage each other sealingly centrally in that forward region, or alternatively a filler strip is compressibly engaged between said pair of gaskets to complete said covering in a sealing manner. Such a covering can be completely assembled before each pane or panel is inserted, so that the external means can even then provide a firm and undetachable seating for the pane or panel and, moreover, this stage of the assembly can also be performed wholly or mainly from inside the building if desired.

Preferably, means are provided to increase the pressure of clamping of the periphery of the pane or panel after it has been mounted in the structure, which allows one or more of said supplementary elements to be employed during assembly to serve as a form of retaining location to hold the pane or panel in place and only after the pane or panel has been correctly located is the clamping pressure increased to ensure sealing engagement of its periphery. This feature can also ensure a satisfactory seal irrespective of minor dimensional variations. The procedure described can be carried out effectively by arranging that the supplementary elements pivotally engage said frame elements and screw-threaded members are provided between the frame elements and the supplementary elements for adjustment of said clamping pressure by causing relative pivotting between the elements. Desirably, also, auxiliary sealing means are provided between the supplementary elements and the pane or panel, and can be secured to the supplementary elements before they are assembled in place.

The pivotal arrangement of the supplementary elements provides the possibility of having a construction in which the external sealing means are mounted on portions of the frame elements disposed forwardly of the pane or panel and that rearwardly of the pane or panel the frame elements are provided with pivotal engagement means for the supplementary elements. Thereby only the frame elements themselves need extend outwardly of the or each pane or panel and the cold bridge to the exterior (i.e. the heat conductive path through the material of the frame structure) can accordingly be kept to a minimum so reducing or avoiding condensation problems.

The appearance of the frame structure can be improved and interference with the adjustment means prevented by providing capping means, which can be simply snapped into place, covering said supplementary elements.

To allow for small dimensional variations, for the convenience of using an assembly of smaller components, and/or for accommodating differential thermal expansion, at least some of the frame elements may have longitudinaly extending engagement means for slidably receiving interconnection means joining adjacent frame elements in a manner permitting adjustment in the plane of the frame. Also as a convenient form of non-expanding fixing when using on extruded section frame element, the section of this element may comprise at least one hook-like arcuate portion for receiving a securing screw with its shank parallel to the longitudinal axis of the frame element.

BRIEF DESCRIPTION OF THE DRAWINGS

The invention will be more particularly described by way of example with reference to the accompanying drawings, wherein.

DESCRIPTION OF THE PREFERRED EMBODIMENTS

Figure 1:
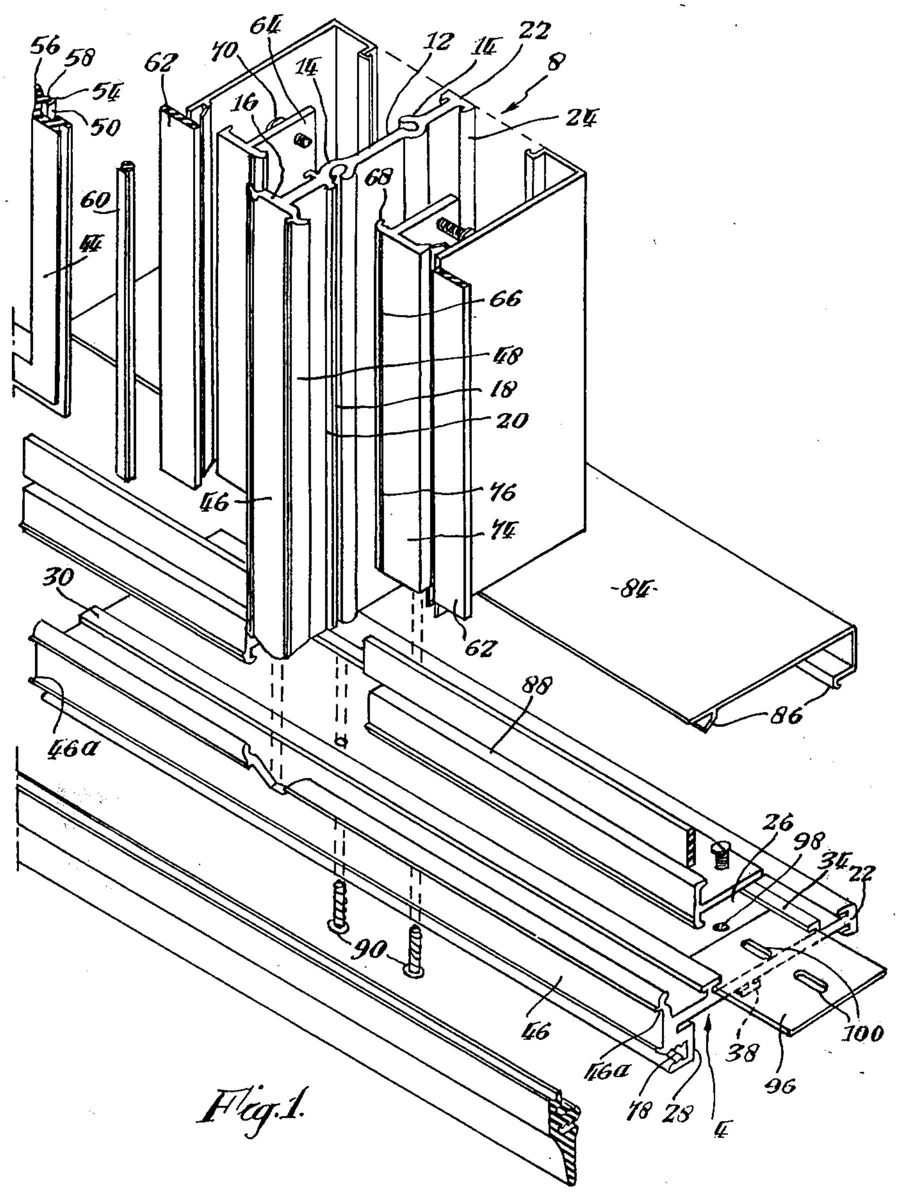
FIG. 1 is an exploded perspective view of a part of a frame structure according to the invention.

Referring to the drawings, the frame structure comprises head and cill sections 2, 4 each extending across the width of the structure, connected at their ends by jamb mullions 6 and at intermediate positions by mullions 8. Each of these frame elements is a substantially T-form section having the head or bar of that sectional shape at the exterior face of the frame and the central leg of the sectional shape extending rearwardly therefrom.

In the mullion section, a central web 12 extends from front to rear and has, intermediate the depth of the section, a pair of spaced arcuate or hook-like portions 14, each internally subtending an angle of more than 180°, that provide receiving apertures for screws. (Closed circular bores extending longitudinally of the mullion can be provided instead but the open sectional form of the portions 14 facilitates manufacture of the section by extrusion.)

At the forward end of the web, the T-form of the section is completed by a symmetrically disposed pair of laterally projecting flanges 16. Spaced rearwards from the flanges 16 and immediately forwards of the first hook-like portion is a symmetrically disposed pair of lateral ribs 18 with forwardly directed lips 20. At the rear of the web there is a symmetrical terminal flange 22, also with forwardly directed lips 24.

The head and cill members 2, 4 and the jamb mullions 6 have the same sectional form as each other and this has many features of the mullion section. The web 26 is of the same depth as a mullion web 12 but has no intermediate arcuate portions. At its forward end a single flange 16 projects laterally to one side only and a gripper flange 28 projects to the opposite side of the web. At a position corresponding to the ribs 18 and projecting to the same side as the flange 16 there is a rib 30 which also has a forwardly directed lip 20 and, additionally, a rearwardly directed lip 32. A first auxiliary rib 34 on the same side of the web as the rib 30 and adjacent the rear of the section has a lip 36 opposed to the lip 32, and on the opposite side of the web, approximately midway between the ribs 30 and 34, there is a second auxiliary rib 38 having opposed lips 40, 42 projecting forwardly and rearwardly respectively. The section has the same form of terminal flange 22 as the mullion section.

The form of the flanges 16 of the sections can be the same as that of the corresponding frame elements described in my co-pending application Ser. No. 430,036 filed Jan. 2, 1974. The flanges serve to support and retain flexible sealing gaskets 44, one on each flange, and the pairs of flanges of the different sections are profiled to provide a forwardly open recess 46 between them with opposed re-entrant side faces 46*a*. The lateral edges of the flanges 16 have rearwardly directed lips 48 and the gaskets 44 are made of a resilient material and can initially be mounted on the flanges in a substantially undeformed state to embrace said lips 48. The section of each gasket 44 comprises a female region 50 that generally fits its associated flange but with some slight clearance at the forward and laterally outer regions and also at the rear region inwardly of the lips 48 where the flange is forwardly recessed. The gasket section also has an inner side margin 52 that fits one side of the recess 46.

The rear face of each gasket 44 comprises an inner lobe 54 located slightly inwardly of the rear region recess of its associated flange. An outer lobe 56 is disposed laterally outwards of the flange and in the unstrained state of the gasket section projects rearwards slightly more than the lobe 54, as may be seen in FIG. 1. Between these two lobes approximately co-incident laterally with the flange lip 46 is an auxiliarly ridge 58 shallower than either of the lobes.

There is a small gap between the two gaskets in the recess 46 of each frame element that allows the gaskets to be put in place without interference with each other. The opposed faces of the two gaskets in this region define a profiled space that into which can be forced a zipper or locking strip 60. The material of the strip 60 is hard in relation to the material of the gaskets but is also elastically deformable by the pressure of the opposed gaskes on it, so that the strip forms a seal between and with gaskets. The maximum width of the zipper strip cross-section lies within the re-entrant side faces of the recess 46 so that the strip cannot work loose when inserted.

Panes or panels P are sealingly gripped at their edges between the gaskets 44 and rear gaskets 62 of flat strip from secured to T-section clamping bars 64 by adhesive before assembly of the frame structure. Each bar has an inneer arm 66 with a terminal lip 68 that engages under the rib 18 or 30. Screws 70 are threaded through the central web of the bar to bear on the web of the associated frame element section. The rear gaskets 62 are carried by outer arm 74 of each clamping bar and have their inner edges located by shoulder 76 of the bar. It can be seen that driving the screw 70 further into a bar will cause the bar to pivot on its lip 68 and urge the outer arm 74 forwards, thereby deforming the resilient gaskets 44, 62 to grip the peripheral margin of the pane or panel P firmly to produce a weathertight seal.

In the outer marginal elements 2, 4, 6 of the frame structure the ribs 30 operate similarly providing a fulcrum for each associated clamping bar. The gripper flanges 28 of these frame elements have forwardly opening sockets 78 with multiple internal ribs that grip a resilient auxiliary gasket 80 the body of which has a similar ribbed section and engages the socket 78 with an interference fit. Projecting outwardly from this body part of the gasket is a flexible limb 82 that bears on face F of the surrounding edge of the aperture that is to be filled by the frame, so closing the gap between the outer periphery of the frame and the edge of the aperture. As with the mullions, a zipper strip 60 is inserted in the gap between the gaskets 44, 80 to exert lateral pressure on the gaskets for sealing and for locking them in place in the same manner as the strip 60 between the juxtaposed pairs of gaskets 44 on each mullion.

On the inner faces of the outer peripheral elements of the frame structure, and on both lateral faces of each mullion, the clamping bars are concealed by capping members 84 that are resiliently clipped into place, the members having hooked end portions 86 that engage the lips 24 of the web rib flanges 22 and lips 88 of the clamping bar outer arms 74.

In the assembly of the frame structure, the head and cill members 2, 4 have screws 90 passing through them to secure the mullions, the screws tapping their own threads in the inner surfaces of the hook-like portions 14 of the mullion web section. Interconnecting, the frame elements at the corners of the frame structure are angle plates 92 consisting of an inner angle plate extending between the ribs 30 and 34 and retained by the lips 72, 36 of these ribs, and front and rear angle plates, the former being retained by the lips 24 and 42 and the latter being retained by the lip 40 and a recess 94 between the gripper arm 28 and the web. A single angle plate can be provided between the lip 24 and recess 94 but the arrangement illustrated provides a stiffer joint.

The retaining lips and recess can also be employed to receive, flat connecting plates 96 spanning a frame element that is divided intermediate its length, such as may be provided to form an expansion joint at one or more points in the structure although this measure will normally be required only in relatively large frame structures. Each plate 96 is attached to the associated lengths of frame element by screws passing through holes 98, 100 in the element and plate, at least one of the holes for each screw being elongated to allow the required movements of the expansion joint.

In the use of the invention the various components of the frame structure can be cut to size and performed before they are brought to a building site. The frame elements and the clamping bars will themselves be provided from extruded metal sections drilled at required positions and cut to form abutting joints with each other, the frame elements at least being mitred for this purpose. The outer sealing gaskets 44 will each be formed as a closed loop: that is to say, the frame structure will itself be of a cellular nature (in its simplest form there being one or more cells of a rectangular form, as exemplified in FIG. 2) and an outer sealing gasket can comprise lengths of an extruded section having the cross-section illustrated with specially moulded junction pieces having a similar cross-section bonded to the ends of these lengths to join them together in the closed loop. A rectangular cell will then have said sealing gaskets formed in a rectangular loop with the four lengths providing the sides of the rectangle joined at the corners of the loop by relatively small L-pieces with which they are integrally moulded, as may be seen in FIG. 1.

The initial stage of the assembly of the structure involves the erection of the main frame elements. If the structure is not too large, this can be done at any convenient place on the site and the initial assembly then put in position in the building. Locking screws (not shown) can be provided to hold the parts of the frame together while the frame is being positioned: e.g. to secure the angle plates 92 to the jamb mullions and the head and cill members. In the initial assembly, the outer gaskets 44 and the peripheral auxiliary gaskets can also be put in place and the zipper strips 60 inserted so locking the gaskets firmly in position, but if the main frame elements are assembled before being positioned in the building the gaskets can be added either before or after said positioning.

The assembly is positioned in a conventional manner, using packing blocks (not shown) if required between the edges of the structure and its surrounding aperture in the building, and it is secured in place by screws (not shown) into said blocks and/or the adjacent structure. At this stage and with the outer sealing gaskets 44 in place, the panes or panels can be put in place from the interior of the building against the rear faces of the sealing gaskets 44 and be secured by the clamping bars 64, which already have the rear sealing gaskets 62 adhered to them. This is conveniently done by first locating loosely the clamping bar for the bottom frame element of a cell of the structure, inserting the pane or panel so that its bottom edge, resting on conventional support blocks B, is engaged by that bar and then adding the clamping bar to the top frame element of the cell to hold the pane or panel lightly in position by the top and bottom bars. The clamping bars at the opposed lateral edges of the pane or panel can next be assembled in place and the clamping screws for the bars tightened down to urge the pane or panel forwards and so grip it firmly and sealingly between the inner and outer gaskets.

When this procedure has been repeated for all the cells of the frame structure, it remains finally to apply sealing mastic 102 behind the outwardly projecting limbs 82 of the auxiliary gaskets 80 as required and to snap into place the capping members 84.

It is a feature of the structure described that the glazing or infill of the frame structure can be applied from the interior of the building so as to avoid any handling problems in raising large, elements to a height and locating them in place while exposed to winds and other difficult weather conditions. In some circumstances it may be preferred to have the panes or panels of a part of the construction applied from the exterior, but this does not preclude the use of a frame structure such as that described since this can be compatible with other forms of structure which allow this to be done, in particular that described in my co-pending application Ser. No. 430,036 filed Jan. 2, 1974.

The illustrated form of structure can be modified in many ways within the scope of the present invention. The structure can be of a single-pane nature, i.e. without mullions, or it can have internal transverse divisions provided by transoms, which may be given the same sectional form as the mullions and be connected thereto in an analogous manner to the connections between the cill and head members with the jamb mullions (the joining angle plates then conveniently being screwed to the mullions). Where required, the connections here and elsewhere in the frame structure can be arranged to allow for thermal expansion movements, as has already been exemplified by the connecting plates 96 with the slotted screw engagements employed there, although in the case of internal frame elements, such as transoms extending between adjacent mullions and/or jamb mullions a simple sliding engagement without securing screws may be sufficient.

Figures 2, 5:
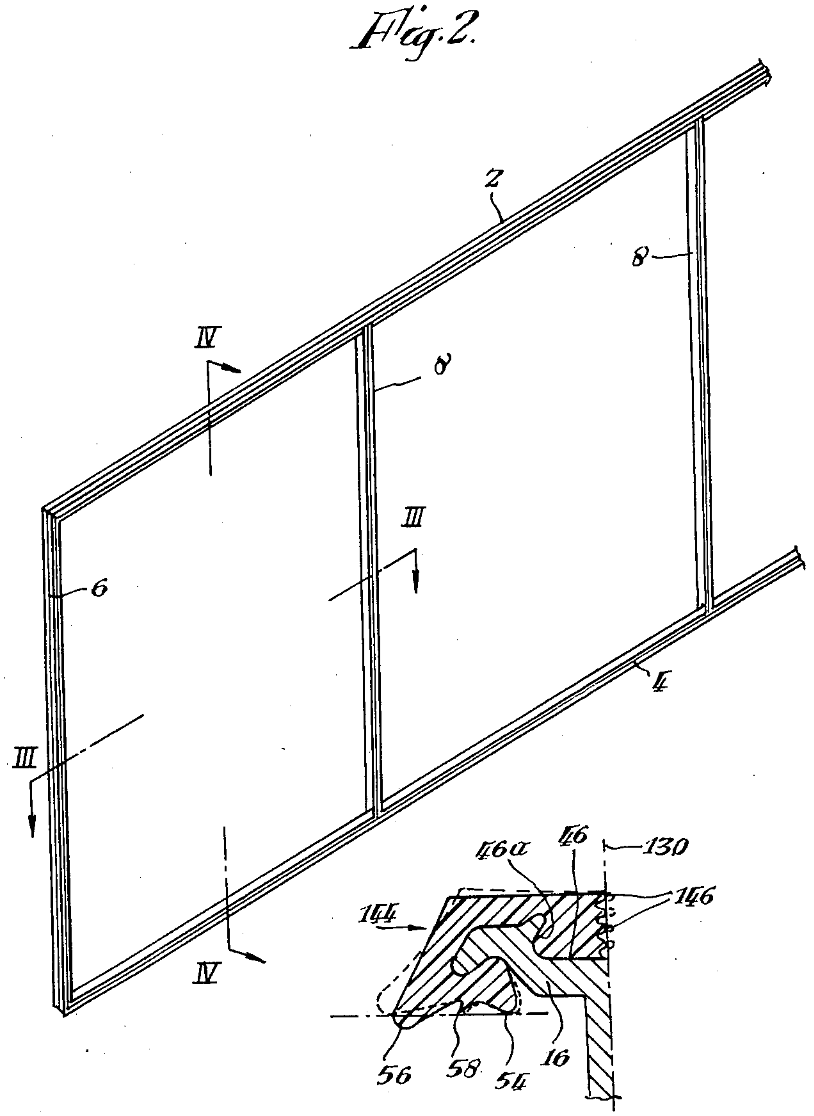
FIG. 2 illustrates a complete frame structure.
FIG. 5 is a detail view of a modified form of external sealing gasket that can be employed in the construction shown in the preceding figures.
Figure 3:
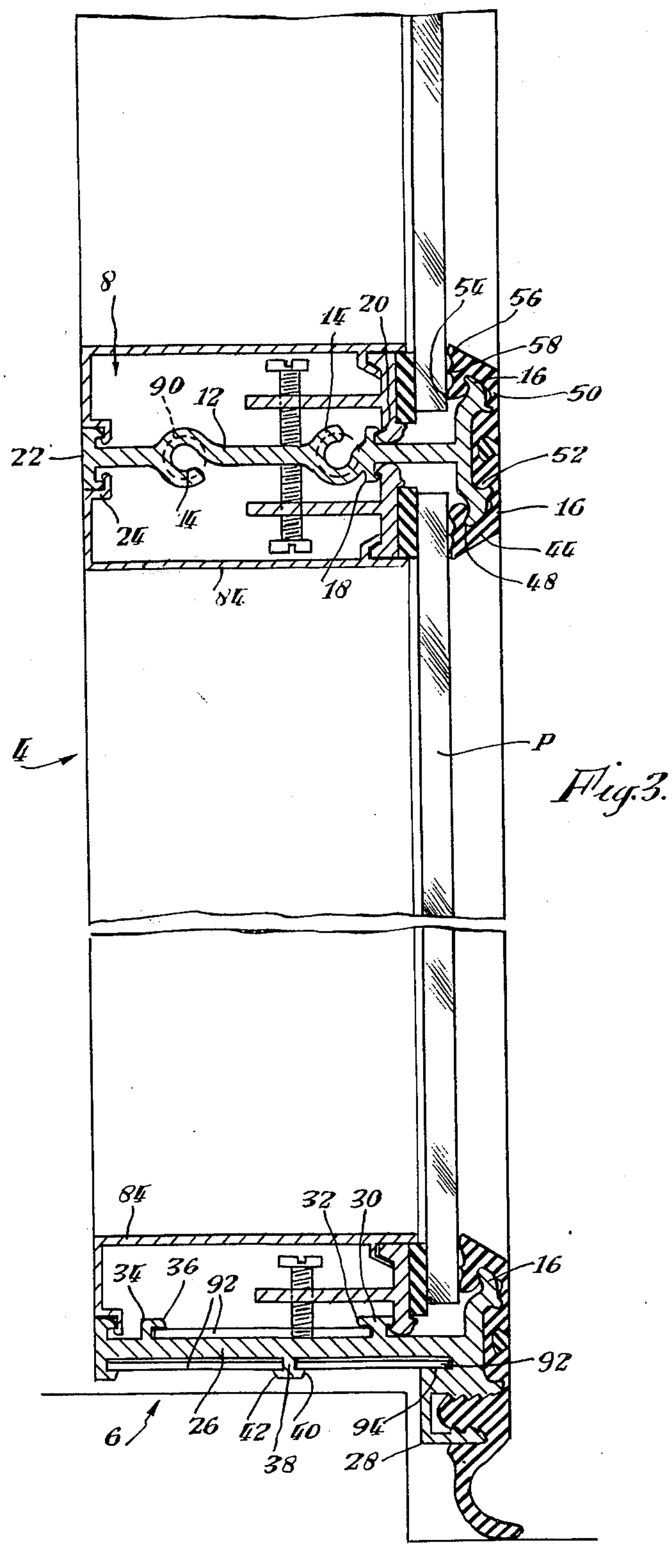
FIGS. 3 and 4 are sectional views in the plane III—III and IV—IV, respectively, in FIG. 2, with the frame structure mounted in an aperture of a wall or other surrounding construction.
Figure 4:
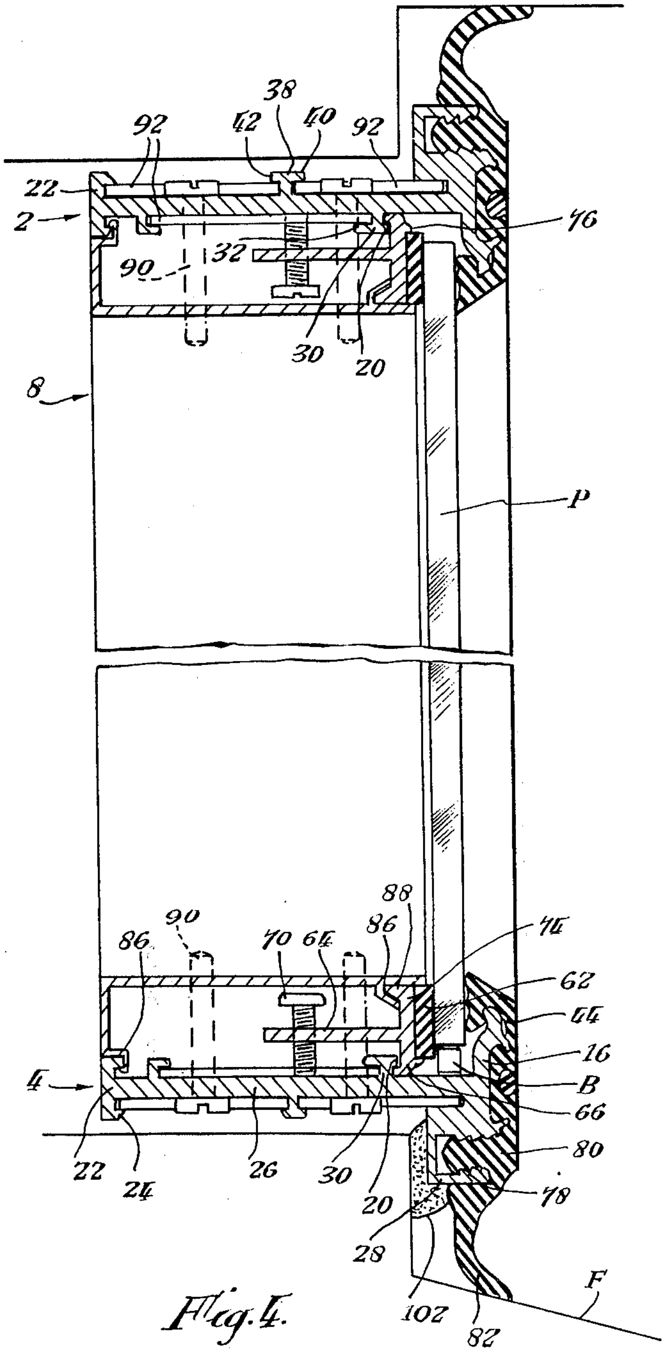

In FIG. 5 there is shown a modified form of sealing gasket 144 that can be substituted for the gaskets 44. The manner of mounting the modified gasket and the way in which it seals against a panel or pane are essentially as already described for the gaskets 44, but no filler or zipper strip is used between an opposed pair of gaskets.

The drawing shows in full lines the form of the gasket after it has been placed on a flange 16 of a frame element but before the pane or panel has been put against it. In the region of the recess 46, the gasket extends substantially to the centre line 130 of the recess and its lateral face there is formed with a plurality of longitudinal ribs 146 having flattened or rounded tops. It will be appreciated that with two such gaskets mounted on opposite flanges 16, their ribs will be directly opposed with each rib very close to or in light contact with the facing rib.

Unlike the gasket 44, there is no clearance at the forward and laterally outer region of the frame element flange 16 between the inside face of the gasket and the front face of the flange. Therefore when the pane or panel P is pressed against the rear of the gasket in the manner already described, the resulting deformation, and in particular the displacement of the outer lobe 56 to the dotted position, causes a corresponding displacement of the front and inner region of the gasket. If there is nothing to oppose this in the recess 46, the ribs will move over the centre line, as is also shown dotted, but of course the opposing gasket will be similarly affected by the insertion of its pane or panel and instead the ribs are urged together into intimate sealing contact at the centre line. The ribbed formation enhances sealing because the smaller contact area gives an increased contact presure.

While a planar structure has been described, it is possible to employ the invention with curved or multiplanar assemblies. Also, although for simplicity a rectangular frame grid has been described, the frame and its cells may have different forms and it is by no means necessary for the cells to be similar in shape to each other. Where the frame structure extends over a number of storeys of a building, the individual cells as defined by the closed loop sealing gaskets, may themselves extend over more than one storey.

A frame structure according to the invention can of course receive infill panes and/or panels of a wide variety of forms. Opening window lights and other ventilation means may be included, for example, and illuminated panels, as well as double glazing and sandwiched or multiple layer panels.

What I claim and desire to secure by Letters Patent is:

1. A curtain wall structure comprising, in combination, a series of rigid elongate members attached together in the form of a frame structure, at least two contiguous spaces being provided by the elongate members in the structure to receive infill elements, and sealing means for the peripheries of said infill elements at the boundaries of said spaces, said sealing means comprising a flexible sealing gasket for each said space in the form of a closed loop of a strip-like material, locating elements in a forward region of said frame structure at the periphery of the associated space engaging said gasket, said locating elements at least at a common boundary between each contiguous pair of said spaces comprising a central portion extending along said common boundary and forward portions projecting laterally oppositely away from said central portion, front faces of said forward portions being spaced apart and a recess being provided between said front faces, each forward portion having a respective flexible sealing gasket mounted on it, a forward element of said sealing gasket covering said front face of its forward portion and an inner marginal element of said sealing gasket extending into said recess, the opposed inner marginal elements of the gaskets of said contiguous pair of spaces being compressed against each other in said recess and opposed sides of the recess providing locking engagement faces that the gasket inner portions are urged against by the force of their mutual compression for locking the gaskets in place on said frame structure elements, further resilient sealing means being provided at the rear of the infill elements between said elements and the frame structure.

2. A frame structure according to claim 1 further comprising a filler strip that is compressibly engaged between said gasket sealing strips in said recess as an additional member of said covering.

3. A frame structure according to claim 1 wherein said adjustable engagement means mounting the supplementary elements on their associated frame elements comprise pivot means for the supplementary elements and screw-threaded members extending between the frame elements and the supplementary elements for adjustment of said clamping pressure by causing relative pivoting between the elements on said pivot means.

4. A frame structure according to claim 1 wherein longitudinally extending engagement means are provided on at least some of the frame elements and the interconnection means comprise members slidably received in said engagement means for joining adjacent frame elements in a manner permitting adjustment in the plane of the frame.

5. A frame structure according to claim 1 wherein at least one of the frame elements is an extruded member having a section comprising at least on hook-like arcuate portion a securing screw being threadably engageable in said portion with its shank parallel to the longitudinal axis of the frame element.

6. A curtain wall structure comprising, in combination, a series of frame elements and interconnection means joining said elements, a structural frame of the curtain wall formed by said joined frame elements comprising a plurality of cells, infill elements of the curtain wall being received in said cells, the frame elements comprising forward portions in front of said infill elements and having front flanges projecting transversely, peripheral edges of said infill elements by being overlapped by said front flanges, the frame elements rearwardly of said infill elements having a smaller transverse dimension than the corresponding front flanges whereby to form a rear opening in each cell larger than the associated infill element, each frame element between adjoining cells having respective front flanges for the adjoining cells separated by a recess in the front face of the element, front and rear surfaces on each front flange, an external sealing arrangement for said peripheral edges of each infill element comprising a sealing gasket strip extending over said front and rear surfaces of said flanges and engaging said recesses in the front faces of the frame elements to be locked in place on said flanges, said sealing arrangement enclosing the frame elements forwards of the infill elements, rear sealing strips for said infill elements, supplementary elements of the frame structure having said rear sealing strips fixed to them, adjustable engagement means mounting said supplementary elements on the frame elements to bring said rear sealing strips into abutment with the peripheral edges of the infill elements opposite said flanges whereby adjustment of said engagement means of the supplementary elements causes the peripheral edges of the infill elements to be gripped in compression between said flanges and said supplementary elements with said sealing gasket strips and rear sealing strips respectively held in sealing compression against front and rear faces of said peripheral edges of the infill elements, cover strips enclosing said supplementary element, a first snap-fitting means between said cover strips and the frame elements at a rear region of the cover strips and a second snap-fitting means between the cover strips and the supplementary elements at a forward region of the cover strips whereby the cover strips are positively retained in place both at their rear and forward region.

* * * * *